(12) United States Patent
Paiss

(10) Patent No.: US 7,020,747 B2
(45) Date of Patent: Mar. 28, 2006

(54) DUAL-STACK MEMORY ARCHITECTURE AND COMPILING METHOD

(75) Inventor: Omry Paiss, Herzliya (IL)

(73) Assignee: Intel Corporation, Santa Clara, CA (US)

(*) Notice: Subject to any disclaimer, the term of this patent is extended or adjusted under 35 U.S.C. 154(b) by 263 days.

(21) Appl. No.: 10/401,608

(22) Filed: Mar. 31, 2003

(65) Prior Publication Data

US 2004/0193826 A1    Sep. 30, 2004

(51) Int. Cl.
*G06F 12/02* (2006.01)
(52) U.S. Cl. .................. 711/132; 711/217; 711/170
(58) Field of Classification Search ............ 711/202, 711/218, 219, 132; 365/189.04; 712/202
See application file for complete search history.

(56) References Cited

U.S. PATENT DOCUMENTS

| 5,214,786 | A | * | 5/1993 | Watanabe et al. ............. 712/41 |
| 5,287,309 | A | * | 2/1994 | Kai ........................ 365/189.04 |
| 6,167,488 | A | * | 12/2000 | Koppala ..................... 711/132 |

* cited by examiner

*Primary Examiner*—T Nguyen
(74) *Attorney, Agent, or Firm*—Pearl Cohen Zedek Latzer, LLP

(57) ABSTRACT

Briefly, embodiments of the invention provide an architecture including two or more stack memories defined on separate memory banks. An apparatus in accordance with embodiments of the invention may include, for example, a processor associated with two stack memories defined on separate single-access memory banks. Embodiments of the invention further provide a method of compilation including, for example, allocating a first variable to a first memory bank and allocating a second variable to a stack memory defined on a second memory bank.

16 Claims, 7 Drawing Sheets

DUAL-STACK MEMORY ARCHITECTURE AND COMPILING METHOD

BACKGROUND OF THE INVENTION

Digital Signal Processors (DSPs), such as a Micro Signal Architecture (MSA) DSP, may use one or more Single-Access Memory (SAM) unit. One or more data bus may connect the SAM unit to the DSP. In such architecture, in each machine cycle, only one operand may be read from a given SAM unit. In order to load two operands simultaneously, a DSP may use two SAM units connected via two, respective, data buses. In some DSP applications, for example, in some MSA DSP applications, each SAM unit is located on a separate memory bank. A DSP may also be associated with a stack memory, which may include a data area or a buffer for storing data or requests for data to be handled by the DSP. The stack memory may be located on one of the SAM units.

In the field of digital signal processing, a processor, such as a DSP, may be associated with one or more Arithmetic Logic Unit (ALU). A DSP may be designed to load two operands from memory in parallel in one machine cycle, and an ALU may be designed to operate on two operands in the same machine cycle.

In programs and software applications running on a computer platform or a dedicated hardware implementation, there may be local variables and/or global variables. A local variable may have a limited scope, and may exist only within a block of a code or a function in which it is defined. A global variable, on the other hand, may exist and may be accessed from anywhere in a code, or by more than one function.

A program written in a high level programming language, for example, C or C++, may be converted to a machine language using a compiler. Local variables are allocated by the compiler to a predefined stack memory, whereas global variables may be defined arbitrarily on any SAM bank.

Two operands cannot be loaded simultaneously from one SAM bank. For example, if a DSP needs to load two operands from the SAM bank, the loading may take at least two machine cycles. If the two operands are local variables, the compiler allocates both variables on the stack memory defined on the SAM bank, whereby the DSP cannot load the two variables simultaneously. Therefore, current stack memory architectures are inefficient when used in conjunction with SAM.

The inefficiency of current stack memory architectures may be further described by referring to a specific example, as follows. A DSP may perform a Multiply-and-Accumulate (MAC) operation, for example, reg+=x[i]*y[i]. Such operation may require loading two operands in parallel. If x[ ] and/or y[ ] are local array variables, then a compiler may face a problem when trying to satisfy two requirements. Since x[ ] and/or y[ ] are local array variables, the compiler will allocate x[ ] and y[ ] on the stack memory. Further, since a MAC operation may require loading two operands in parallel, the operation may require allocating x[ ] and y[ ] in separate SAM banks. These two requirements may be contradicting, and may cause problems and inefficiency in programming and/on performance. For example, a programmer may be required to implement a specific solution, which may be manually tailored for a specific configuration and may involve manual changes to multiple files. Additionally, a programmer may need to define and use a copy or several copies of variables and arrays, involving additional programming time and requiring more memory resources.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1A:
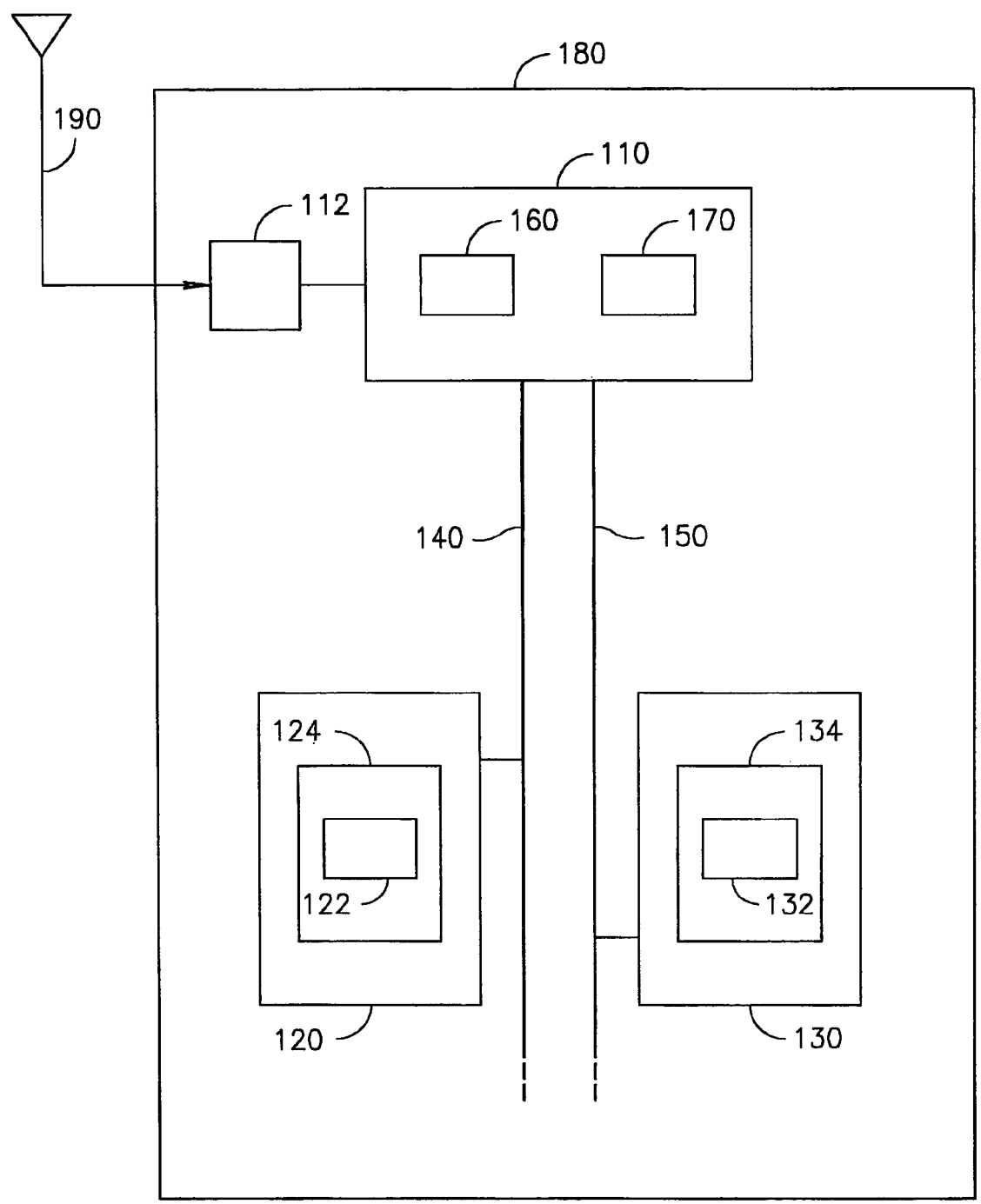
FIG. 1A is a schematic illustration of a wireless communication device incorporating a processor associated with two memory banks and a dual-stack memory architecture according to exemplary embodiments of the invention, wherein each memory bank is connected to one data bus.
Figure 1B:
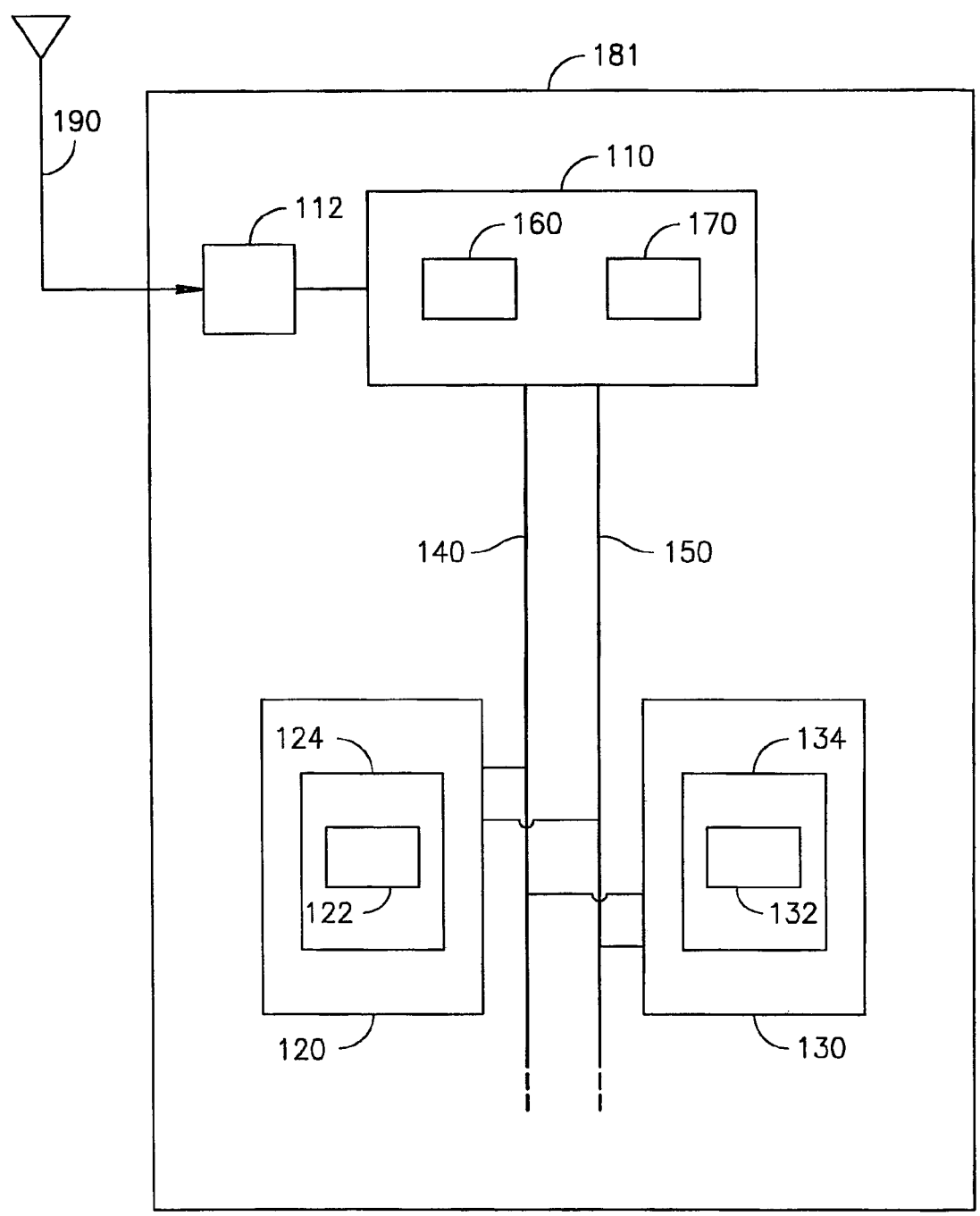
FIG. 1B is a schematic illustration of a wireless communication device incorporating a processor associated with two memory banks and a dual-stack memory architecture according to exemplary embodiments of the invention, wherein each memory bank is connected to two data buses.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Embodiments of the present invention may solve the problems described above by defining and using two or more stack memories on two or more, respective, Single-Access Memory (SAM) banks. The two or more SAM banks may be implemented, for example, in the form of two or more, distinct (i.e., physically separated), units; however, multiple SAM banks may also be implemented, for example, on a single device or memory unit.

Although embodiments of the present invention are described herein in the context of a wireless communication device, it will be appreciated by persons skilled in the art that the invention may also be suitable, with appropriate adaptation, for use with any other device, method or system where a processor associated with one or more memory unit may be used for processing more than one variable simultaneously. For example, embodiments of the invention may be used in a Personal Digital Assistant (PDA) device, or a player of digital data encoded according to Moving Picture Experts Group (MPEG) Audio Layer 3 (MP3) standards.

FIGS. 1A, 1B, 1C and 1D are schematic illustrations of wireless communication devices 180, 181, 182 and 183, incorporating a processor 110 associated with a dual-stack memory architecture according to exemplary embodiments of the invention. In an embodiment of the present invention, wireless communication device 180, 181, 182 and/or 183 may further include, for example, a transceiver 112 and an optional antenna 190. It is noted that FIGS. 1A, 1B, 1C and 1D schematically illustrate exemplary embodiments of the present invention, and other embodiments of the present invention, including additional and/or alternate components or design, may be implemented according to specific requirements.

Although the present invention is not limited in this regard, transceiver 112 may include any suitable transceiver unit and/or circuit, for example, a cellular radiotelephone transceiver, a two-way radio transceiver, a digital system transceiver, a Wireless Local Area Network (WLAN) transceiver, a Global System for Mobile-communications (GSM) transceiver, a General Packet Radio Service (GPRS) transceiver, an Enhance General Packet Radio Service (EGPRS) transceiver, and the like.

Antenna 190 may include, for example, an internal and/or external antenna, e.g., a Radio Frequency (RF) antenna and/or a dipole antenna. In embodiments of the present invention, processor 110 may include, for example, a Digital Signal Processor (DSP), a Central Processing Unit (CPU), a core of a processor, a plurality of processors, a semiconductor component, e.g., a chip or a microchip, or any other suitable multi-purpose or specific processor, as well as additional integrated components that may be required by specific applications. In exemplary embodiments of the invention, processor 110 includes an A-stack pointer 160 and a B-stack pointer 170, the construction and operation of which is described below.

In accordance with embodiments of the present invention, wireless communication device 180, 181, 182 and/or 183 may further include a data bus 140, a data bus 150, an A-memory 120 and a B-memory 130, the construction and operation of all of which components is described in detail below.

In embodiments of the present invention, A-memory 120 may include, for example, a SAM bank 124, and B-memory 130 may include a SAM bank 134. It is noted that A-memory 120 and B-memory 130 may be located on separate hardware components or on separate portions of one hardware component, or using any other suitable implementation, if desired.

Figure 1C:
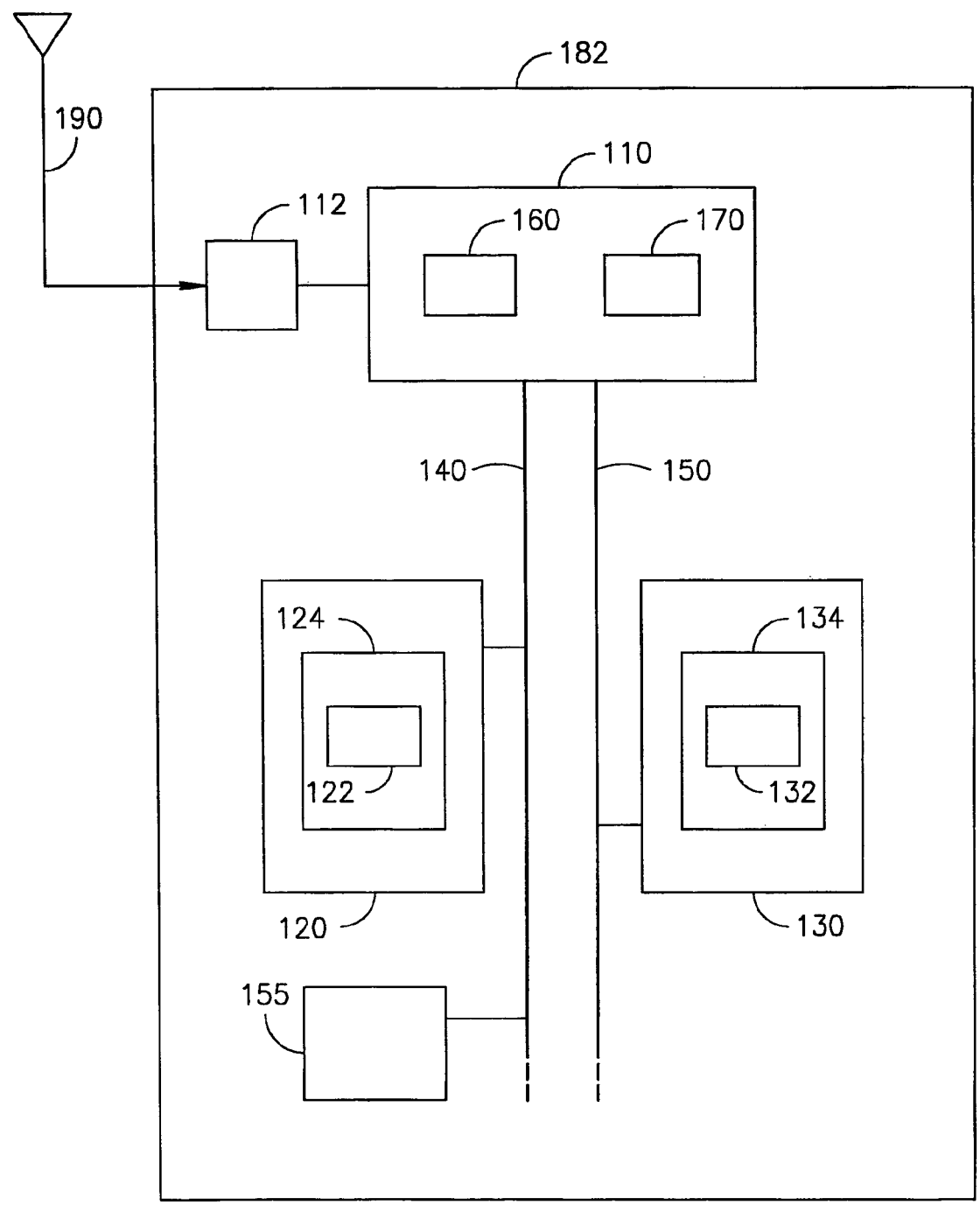
FIG. 1C is a schematic illustration of a wireless communication device incorporating a processor associated with three memory banks and a dual-stack memory architecture according to exemplary embodiments of the invention, wherein each memory bank is connected to one data bus.

As illustrated schematically in FIGS. 1A and 1C, A-memory 120 may be connected to processor 110 using bus 140, and B-memory 130 may be connected to processor 110 using bus 150. Alternatively, as illustrated schematically in FIGS. 1B and 1D, A-memory 120 may be connected to processor 110 using both buses 140 and 150, and B-memory 130 may be connected to processor 110 using both buses 140 and 150. It will be appreciated by persons skilled in the art that in the embodiments of FIGS. 1B and 1D, although each of memory banks 120 and 130 is connected to processor 120 using two data buses, only one operand may be loaded from each memory bank in one machine cycle because the memory banks are single access memory banks.

It is noted that in embodiments of the present invention, processor 110, A-memory 120, B-memory 130, bus 140, bus 150, or any combination of these components, may be implemented using one or several hardware and/or software units, and may be, for example, physically implemented on one or more semiconductor components.

In exemplary embodiments of the present invention, two or more stack memories may be defined on two or more respective SAM banks. For example, a first stack memory, denoted A-stack 122, may be defined on bank 124 of A-memory, and a second stack memory, denoted B-stack 132, may be defined on bank 134 of B-memory 130.

Device 180, 181, 182 and/or 183 may include one or more stack pointers, for example, A-stack pointer 160, pointing to A-stack 122, and B-stack pointer 170, pointing to B-stack 132, to accommodate the architecture in accordance with exemplary embodiments of the present invention, where two or more stack memories may be implemented on separate memory banks. Each of A-stack pointer 160 and B-stack pointer 170 may include, for example, a register containing a memory address pointing to a certain variable in a stack memory.

In an embodiment of the present invention, A-stack pointer 160 and/or B-stack pointer 170 may be stored in internal and/or external memories units, e.g., registers, of processor 110. Additionally or alternatively, the functions of A-stack pointer 160 and/or B-stack pointer 170 may be implemented by a compiler using general purpose address registers.

During compilation of a code, a compiler running on a computer platform that generates machine code for processor 110 may encounter an operation that requires loading in parallel of two local variables, Local-A and Local-B, respectively. The compiler may allocate Local-A on A-stack 122, and may allocate Local-B on B-stack 132, or vice versa. Using such architecture in accordance with embodiments of the present invention may allow loading in parallel of Local-A and Local-B in one machine cycle, as described in more detail below with reference to FIG. 2.

Figure 1D:
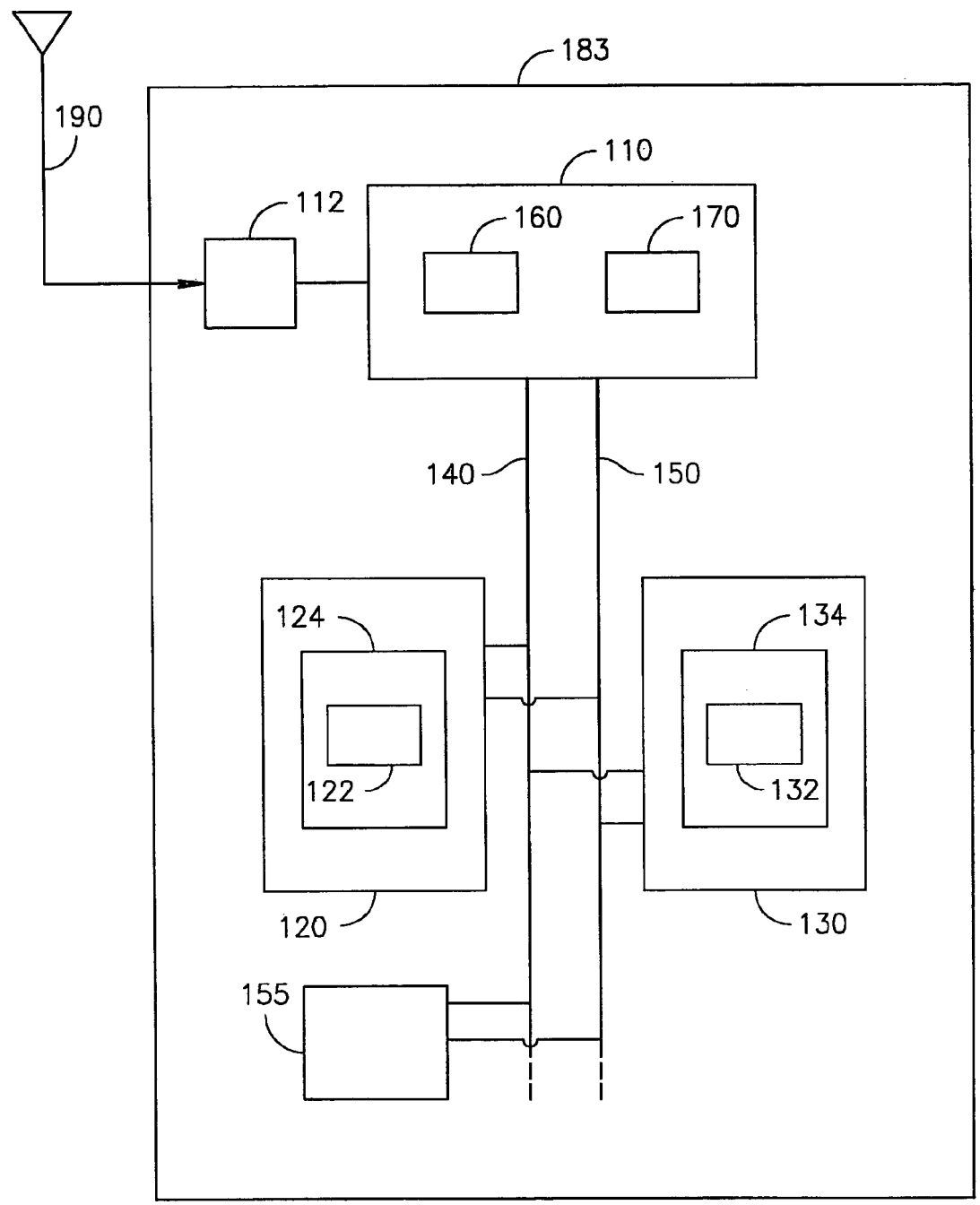
FIG. 1D is a schematic illustration of a wireless communication device incorporating a processor associated with three memory banks and a dual-stack memory architecture according to exemplary embodiments of the invention, wherein each memory bank is connected to two data buses.

As illustrated schematically in FIGS. 1C and 1D, in embodiments of the present invention, device 182 and/or 183 may include additional memories, for example, C-memory 155. As illustrated schematically in FIG. 1C, C-memory 155 may be connected to processor 110 using bus 140. Alternatively, as illustrated schematically in FIG. 1D, C-memory 155 may be connected to processor 110 using buses 140 and 150.

During compilation of a code, a compiler running on a computer platform that generates machine code for processor 110 may encounter an operation that requires loading in parallel of a local variable, Local-L, and a global variable, Global-G. In such a case, Local-L may be allocated on A-stack 122, and Global-G may be allocated on B-stack 132, or vice versa. Alternatively, Local-L may be allocated on A-stack 122 or B-stack 132, and Global-G may be allocated on C-memory 155. Using such architecture in accordance with embodiments of the present invention may allow loading in parallel of Local-L and Global-G in one machine cycle, as described in more detail below with reference to FIGS. 3A and 3B.

Figure 2:
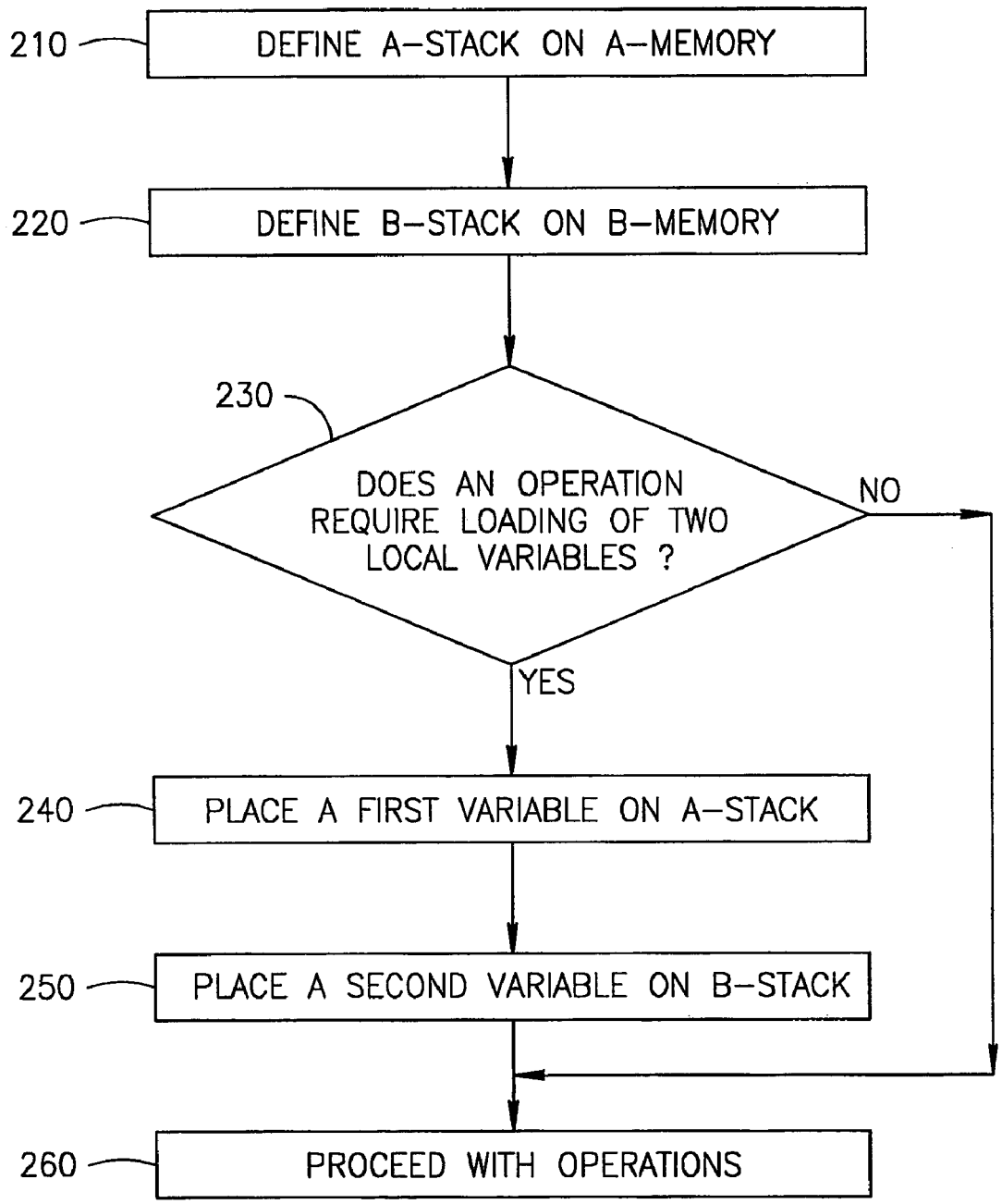
FIG. 2 is a schematic flowchart depicting a method of compilation using a multi-stack memory architecture according to exemplary embodiments of the invention, applied to an exemplary scenario that requires loading of two local variables.

Reference is now made to FIG. 2, which is a schematic flowchart depicting a method of compilation using a multi-stack memory architecture according to exemplary embodiments of the invention, applied to an exemplary scenario that requires loading of two local variables, Local-A and Local-B, respectively.

As indicated at block 210, a stack memory, for example, A-stack 122, may be defined on a first memory bank, for example, on bank 124 in A-memory 120. As indicated at block 220, a second stack memory, for example, B-stack 132, may be defined on a second memory bank, for example, on bank 134 in B-memory 130. In exemplary embodiments of the invention, the definition of stack memories 122 and 132 may be performed only once, e.g., during initial use or configuration of the memory architecture, and the same definitions may be used for subsequent operation of the memory architecture, e.g., for subsequent compilation runs and/or passes. Alternatively, stack memories 122 and 132 may be repeatedly, periodically and/or occasionally re-defined as may be required by specific applications.

As indicated at block 230, in an embodiment of the present invention, a check may be performed to determine whether an operation requires loading of two local variable arrays, for example, Local-A and Local-B. In an embodiment of the present invention, if the check result is positive, then, as indicated at block 240, an array representing the first local variable, namely, Local-A, may be allocated in A-stack 122, and, as indicated at block 250, an array representing the second local variable, namely, Local-B, may be allocated in B-stack 132, or vice versa. If the check result is negative, then the above two operations may be skipped and conventional operations may resume, as indicated at block 260.

Using the method of FIG. 2, or any other suitable method in accordance with embodiments of the present invention, the two local variables, Local-A and Local-B, may be loaded in parallel in one machine cycle. It is noted that the method of FIG. 2 may be used, for example, in conjunction with the architecture of FIGS. 1A, 1B, 1C and/or 1D, as well as with other architectures in accordance with embodiments of the present invention.

Figure 3A:
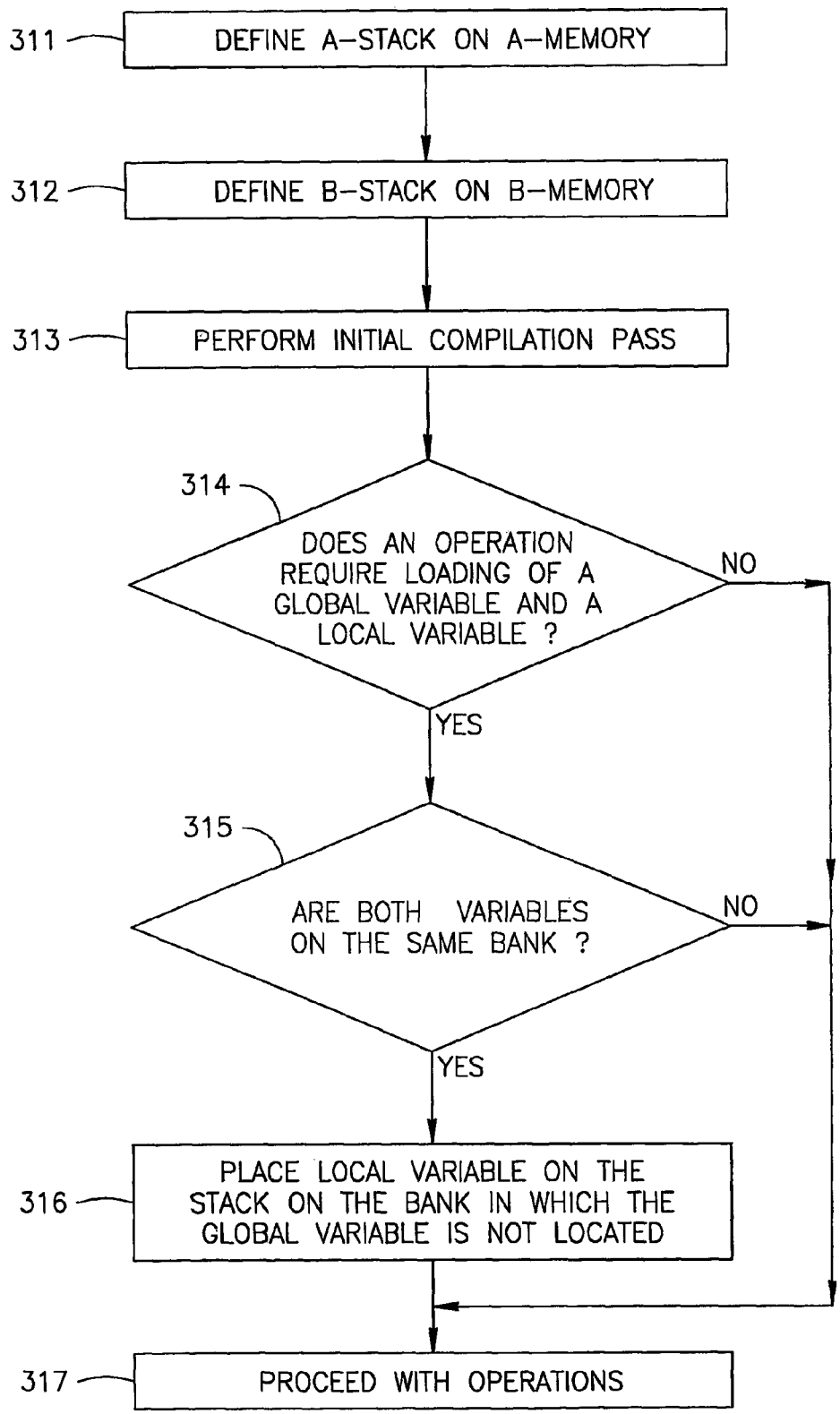
FIG. 3A is a schematic flowchart depicting a method of compilation using a multi-stack memory architecture according to exemplary embodiments of the invention, applied to an exemplary scenario that requires loading of a local variable and a global variable, which may be used, for example, in conjunction with the architecture of FIGS. 1A and/or 1C.

FIG. 3A is a schematic flowchart depicting a method of compilation using a multi-stack memory architecture according to exemplary embodiments of the invention, applied to an exemplary scenario that requires loading of a local variable, Local-L, and a global variable, Global-G. The method of FIG. 3A may be used, for example, in conjunction with the architecture of FIGS. 1A and/or 1C, as well as other architectures in accordance with embodiments of the present invention.

The method of FIG. 3A may begin, as indicated at block 311, by defining a first stack memory, for example, A-stack 122, on a first memory bank, for example, on bank 124 in A-memory 120. As indicated at block 312, a second stack memory, for example, B-stack 132, may be defined on a second memory bank, for example, on bank 134 in B-memory 130. In exemplary embodiments of the invention, the definition of stack memories 122 and 132 may be performed only once, e.g., during initial use or configuration of the memory architecture, and the same definitions may be used for subsequent operation of the memory architecture, e.g., for subsequent compilation runs and/or passes. Alternatively, stack memories 122 and 132 may be repeatedly, periodically and/or occasionally re-defined as may be required by specific applications.

As indicated at block 313, an initial pass in a compilation process may be performed. The initial pass may result in a global variable array, Global-G, being allocated on either A-memory 120 or B-memory 130. Additionally, the initial pass may result in a local variable array, Local-L, being allocated on either A-stack 122 in A-memory 120 or B-stack 132 in B-memory 130.

As indicated at block 314, a check may be performed, for example, during a second pass in a compilation process, to determine whether an operation requires loading of Local-L and Global-G.

In an embodiment of the present invention, if the result of the check of block 314 is positive, then, as indicated at block 315, a check may be performed to determine whether both Local-L and Global-G are allocated on the same SAM bank, for example, on bank 124 in A-memory 120.

If the result of the check of block 315 is positive, then, as indicated at block 316, Local-L may be allocated to a stack memory on a SAM bank other than the SAM bank where Global-G is present; for example, Local-L may be allocated to B-stack 132 on bank 134 in B-memory 130. The checks of blocks 314 and 315 and the re-allocation 316 of Local-L may be performed, for example, by a compiler during a second pass of the compilation process.

If the result of the check of block 315 is negative, then the re-allocation 316 of Local-L is not required and may be skipped, and conventional operations may resume, as indicated at block 317.

If the result of the check of block 314 is negative, then the check of block 315 and the re-allocation 316 of Local-L are not required and may be skipped, and conventional operations may resume, as indicated at block 317.

It is noted that using the method of FIG. 3A, or any other suitable method in accordance with embodiments of the present invention, the two variables, Local-L and Global-G, may be loaded in parallel in one machine cycle.

Figure 3B:
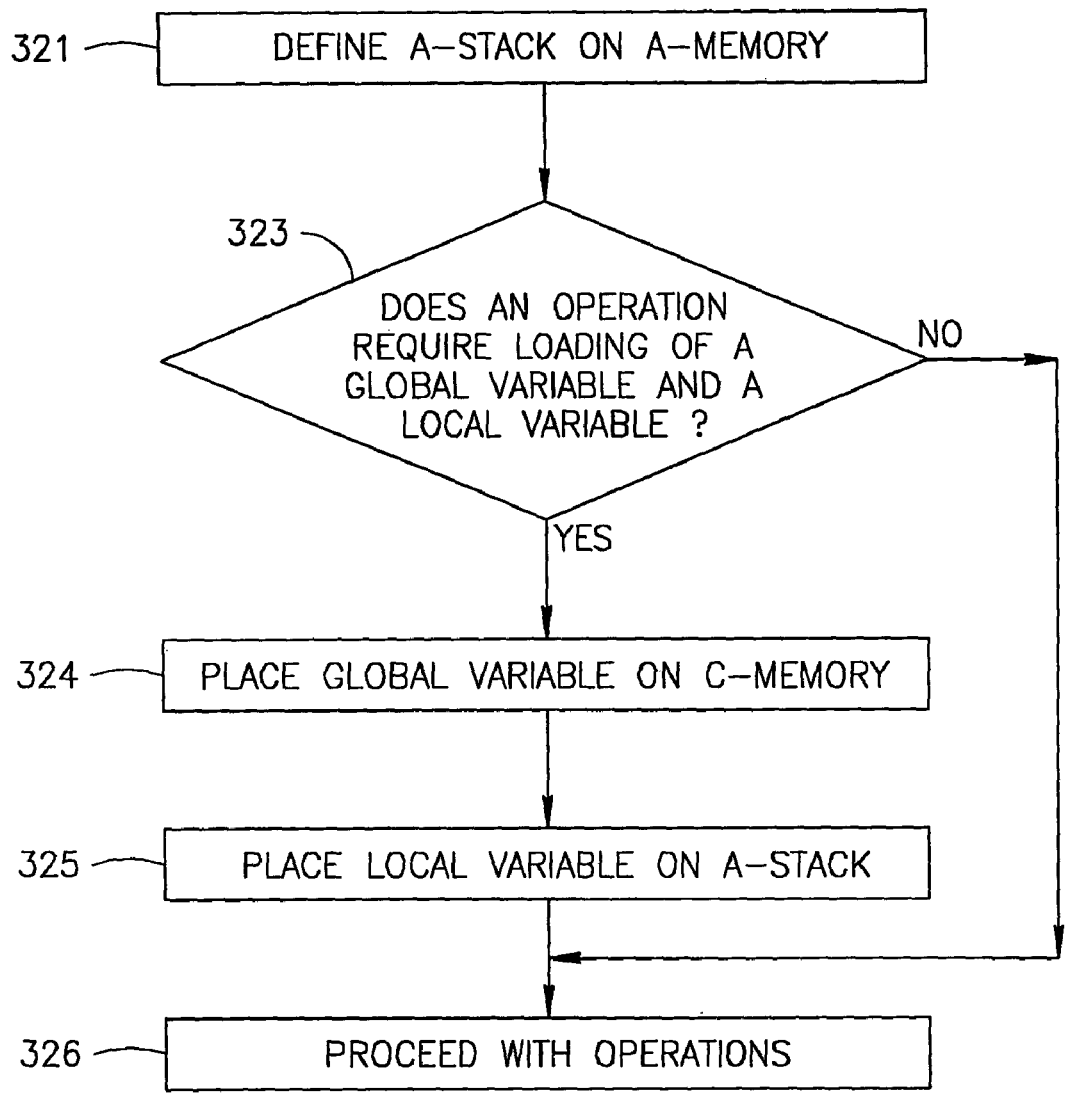
FIG. 3B is a schematic flowchart depicting a method of compilation using a memory architecture according to exemplary embodiments of the invention, applied to an exemplary scenario that requires loading of a local variable and a global variable, which may be used, for example, in conjunction with the architecture of FIGS. 1B and/or 1D.

FIG. 3B is a schematic flowchart depicting a method of compilation using a memory architecture according to exemplary embodiments of the invention, applied to an exemplary scenario that requires loading of a local variable, Local-L, and a global variable, Global-G. The method of FIG. 3B may be used, for example, in conjunction with the architecture of FIGS. 1B and/or 1D, as well as other architectures in accordance with embodiments of the present invention.

The method of FIG. 3B may begin, as indicated at block 321, by defining a stack memory, for example, A-stack 122, on a memory bank, for example, on bank 124 in A-memory 120.

As indicated at block 323, a check may be performed to determine whether an operation requires loading of Local-L and Global-G.

If the check result is positive, then, as indicated at block 324, Global-G may be allocated to C-memory 155, and, as indicated at block 325, Local-L may be allocated to A-stack 122 on A-memory 120.

If the check result is negative, then the above two operations may be skipped and conventional operations may resume, as indicated at block 326.

It is noted that using the method of FIG. 3B, or any other suitable method in accordance with embodiments of the present invention, the two variables, Local-L and Global-G, may be loaded in parallel in one machine cycle. It will be appreciated by persons skilled in the art that a second stack memory may not required in this exemplary embodiment.

In order to further describe some exemplary embodiments of the present invention, several portions of a source code in the C programming language are presented herein, denoted Code 1, Code 2A, Code 2B and Code 3, respectively. It is noted that these code portions are presented for exemplary purposes only, and they are not intended to limit the scope of the present invention in any respect.

An example of a source code which may be used in conjunction with a dual-stack memory architecture in accordance with embodiments of the present invention, is given by the following exemplary code:

Code 1

```
long func(*input )
{
    short x[10];
    short y[10];
    long sum=0;
    int j;
    func1(input, x);
    func2(input, y);    /* x and y are calculated from the input */
    for (j=0 ; j < 10 ; j++)
        sum += (long) x[j]*y[j];    /* MAC instruction*/
    return sum;
}
```

In accordance with embodiments of the present invention, while passing through Code 1, a compiler may detect that both "x[ ]" and "y[ ]" are local variables that require multiplying. In contrast to conventional compilers, which allocate both "x[ ]" and "y[ ]" on one stack memory, a compiler in accordance with embodiments of the present invention may allocate "x[ ]" and "y[ ]" on two stack memories in two separate SAM banks, thus allowing, for example, to load in parallel both "x[ ]" and "y[ ]" using two data buses in one machine cycle.

It will be appreciated that the use Code 1 in conjunction with a dual-stack memory architecture in accordance with embodiments of the present invention may obviate the need to use more complex codes, e.g., to enable performing a MAC operation in one machine cycle, for example, the following code:

Code 2A

```
Extern short   *ybuf //      for Visual C compiler
//segment("YRAM") extern short *ybuf; // for Intel MSA compiler
long func(*input )
{
    short x[10];
    long sum=0;
    int j;
    func1(input, x);
    func2(input, ybuf);   /* x and ybuf are calculated from the input */
                          /* ybuf is equivalent to y in Code 1 */
    for (j=0 ; j < 10 ; j++)
        sum += (long) x[j] * ybuf[j];   /* MAC instruction*/
    return sum;
}
```

It is noted that in order to use Code 2A in conjunction with a conventional compiler, a programmer may need to manually allocate "ybuf" on the memory bank that does not contain the stack memory. With conventional architectures, this manual allocation may be done by inserting the line "segment("YRAM") extern short *ybuf;" into Code 2A, and by using a linker configuration file which may include, for example, the following code:

Code 2B

```
...
MEMORY
{
DATA_B {TYPE(RAM) START(0x100000) LENGTH(0x300) WIDTH(16) }
}
...
SECTIONS
{
GlobalCopyOnB memory
    {
        INPUT_SECTION_ALIGN(4)
        INPUT_SECTIONS( $OBJECTS(YRAM) )
        ...
    } > DATA_B
}
```

It will be appreciated by persons skilled in the art that, embodiments of the present invention may take advantage of the relatively simple Code 1, instead of the more complicated Codes 2A and 2B, and thus may achieve the following benefits. The two variables, "x[ ]" and "y[ ]", may be loaded in parallel in one machine cycle, obviating the need for a manual modification of Code 1 into Code 2A, and obviating the need for a manual insertion of Code 2B into a linker configuration file. Furthermore, in conventional architectures, using the same variable "ybuff" for several functions of a source code may lead to errors, for example, when a first function calls for a second function which may destroy the "ybuff" defined by the first function. Additionally or alternatively, using conventional architectures to define a separate "ybuff" for each function may take-up memory space. It is noted that the ability to use the simple Code 1 in accordance with embodiments of the present invention, instead of the more complex Codes 2A and 2B, may obviate the need to perform complicated, time-consuming, and error-prone overlaying operations, in which a programmer may need to manually define which variables may or may not overlap between functions.

An exemplary embodiment of the present invention, as described above, may define and use two stack memories on separate memory banks. However, the present invention is not limited in this respect, and some embodiments of the present invention may define and use more than two stack memories, defined on more than two, respective, memory banks, to achieve specific results and/or in accordance with specific design requirements. For example, an embodiment of the present invention may define and use three stack memories, defined on three separate memory banks; such an embodiment may be used, for example, to increase efficiency when handling an operation that requires loading three operands in parallel (if a processor has such capability) and/or when handling an operation that requires loading in parallel of various different pairs of operands out of a set of more than two operands. Therefore, embodiments of the present invention may be implemented to define and/or use any desired multi-stack memory architecture.

An example of a source code that may be used in conjunction with a triple-stack memory architecture in accordance with embodiments of the present invention, is given in the following exemplary code:

Code 3

```
long func(*input )
{
    short x[10];
    short y[10];
    short z[10];
    long sum=0;
    int j;
    func1(input, x);
    func1(input, y);
    func2(input, z);    /*x, y and z are calculated from the input */
    for (j=0 ; j < 10 ; j++)
        sum += (long) x[j]*y[j];    /* MAC instruction*/
    for (j=0 ; j < 10 ; j++)
        sum += (long) x[j]*z[j];    /* MAC instruction*/
    for (j=0 ; j < 10 ; j++)
        sum += (long) y[j]*z[j];    /* MAC instruction*/
    return sum:
}
```

Code 3 operates on three arrays, namely, "x[ ]", "y[ ]" and "z[ ]". In conventional architectures, the three arrays are allocated on one stack memory. Using a triple-stack memory architecture in accordance with embodiments of the present invention, the three arrays may be allocated on three separate stack memories located in separate memory banks, to allow, for example, loading in parallel different combinations of two out of the three variables in one machine cycle.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

The invention claimed is:

1. An apparatus comprising a processor associated with a first stack memory defined on a first memory bank and associated with a second stack memory defined on a second memory bank, wherein said processor is to check whether an operation requires loading two or more variables, and if the check result is positive, allocate a first variable of the two or more variables to the first stack memory and allocate a second variable of the two or more variables to the second stack memory.

2. The apparatus of claim 1, wherein the processor comprises a first stack pointer associated with the first stack memory and a second stack pointer associated with the second stack memory.

3. The apparatus of claim 2, comprising:
a first data bus to connect the first memory bank to the processor; and
a second data bus to connect the second memory bank to the processor.

4. A wireless communications device comprising:
a Global System for Mobile-communications transceiver able to send and receive signals; and
a processor associated with a first stack memory defined on a first memory bank and associated with a second stack memory defined on a second memory bank, wherein said processor is to check whether an operation requires loading two or more variables, and if the check result is positive, allocate a first variable of the two or more variables to the first stack memory and allocate a second variable of the two or more variables to the second stack memory.

5. The wireless communications device of claim 4, wherein the processor comprises a first stack pointer associated with the first stack memory and a second stack pointer associated with the second stack memory.

6. The wireless communications device of claim 5, comprising a first data bus connecting the first memory bank to the processor and a second data bus connecting the second memory bank to the processor.

7. A method comprising:
checking whether an operation requires loading two or more variables; and
if the check result is positive, allocating a first variable of the two or more variables to a first stack memory defined on a first memory bank and allocating a second variable of the two or more variables to a second stack memory defined on a second memory bank.

8. The method of claim 7, wherein allocating the first variable comprises allocating a first local variable, and wherein allocating the second variable comprises allocating a second local variable.

9. The method of claim 8, comprising compiling a code.

10. The method of claim 7, wherein allocating the first variable comprises allocating a global variable, and wherein allocating the second variable comprises allocating a local variable.

11. The method of claim 7, comprising compiling a code.

12. An article comprising a machine-readable storage medium having stored thereon instructions that, when executed by a processing platform, result in:
checking whether an operation requires loading two or more variables; and
if the check result is positive, allocating a first variable of the two or more variables to a first stack memory defined on a first memory bank and allocating a second variable of the two or more variables to a second stack memory defined on a second memory bank.

13. The article of claim 12, wherein the instructions that result in allocating the first variable result in allocating a first local variable, and wherein the instructions that result in allocating the second variable result in allocating a second local variable.

14. The article of claim 13, wherein the instructions comprise a compiler.

15. The article of claim 12, wherein the instructions that result in allocating the first variable result in allocating a global variable, and wherein the instructions that result in allocating the second variable result in allocating a local variable.

16. The article of claim 12, wherein the instructions comprise a compiler.

* * * * *